(12) United States Patent  
Veeraraghavan et al.

(10) Patent No.: US 8,155,447 B2  
(45) Date of Patent: Apr. 10, 2012

(54) DETERMINING POINTS OF PARABOLIC CURVATURE ON SURFACES OF SPECULAR OBJECTS

(75) Inventors: Ashok Veeraraghavan, North Cambridge, MA (US); Oncel C. Tuzel, Cambridge, MA (US); Aswin Sankaranarayanan, Houston, TX (US); Amit K. Agrawal, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 251 days.

(21) Appl. No.: 12/730,279

(22) Filed: Mar. 24, 2010

(65) Prior Publication Data

US 2011/0235916 A1 Sep. 29, 2011

(51) Int. Cl.  
*G06K 9/46* (2006.01)  
*H03F 1/26* (2006.01)

(52) U.S. Cl. ...................................... 382/190; 702/190

(58) Field of Classification Search .................. 382/190, 382/198; 348/14.1, 154, 155, 207.1; 345/606; 702/190  
See application file for complete search history.

(56) References Cited

U.S. PATENT DOCUMENTS 5,465,153 A * 11/1995 Ladewski ....................... 356/601  
6,408,109 B1 * 6/2002 Silver et al. .................... 382/300

* cited by examiner

*Primary Examiner* — Abolfazl Tabatabai  
(74) *Attorney, Agent, or Firm* — Dirk Brinkman; Gene Vinokur (57) ABSTRACT

Embodiments of the invention disclose a system and a method for determining points of parabolic curvature on a surface of a specular object from a set of images of the object is acquired by a camera under a relative motion between a camera-object pair and the environment. The method determines directions of image gradients at each pixel of each image in the set of images, wherein pixels from different images corresponding to an identical point on the surface of the object form corresponding pixels. The corresponding pixels having substantially constant the direction of the image gradients are selected as pixels representing points of the parabolic curvature.

20 Claims, 6 Drawing Sheets

DETERMINING POINTS OF PARABOLIC CURVATURE ON SURFACES OF SPECULAR OBJECTS

FIELD OF THE INVENTION

This invention relates generally to determining points of parabolic curvature, and more particularly to determining points of parabolic curvature on surfaces of specular objects.

BACKGROUND OF THE INVENTION

Image invariants are properties of images of an object that remain unchanged with changes in parameters of a camera and/or illumination. For example, geometric invariants are related to apparent size of different parts of objects and are therefore equally valid for the objects with any reflectance characteristics of the surface, including diffuse, specular and transparent objects. However, in order to use the geometric invariants from the images of the object, point correspondences across the images should be identified. Identifying the point correspondences from images of the diffuse object is a meaningful task since the diffuse object has photometric features. But specular object, i.e., the object having surface with mirror-like reflectance, does not have an appearance of its own, but rather present a distorted view of an environment surrounding the object.

Therefore, identifying the point correspondences using an image feature descriptor of the specular object is challenging. The image feature descriptor finds correspondences between reflections of the environment, which do not correspond to the same points on the surface of the object. Thus, there is a need to find photometric properties of the specular object that are invariant to the surrounding environment.

Points of parabolic curvature are fundamental to perception of a shape of the diffuse and/or the specular objects. Because these points correspond to a geometric property of the surface, these points can then be used for a variety of machine vision tasks such as object recognition, pose estimation and shape regularization.

Accordingly, it is desired to determine photometric properties of the images of mirror surfaces around points that exhibit parabolic curvature without knowledge about shape of the surface of the specular object and/or the surrounding environment.

SUMMARY OF THE INVENTION

It is an object of the subject invention to provide a method for determining a point of parabolic curvature on a surface of a specular object.

It is further object of the invention to provide such a method that determines the point of parabolic curvature without previous knowledge about shape of the object and/or surrounding environment.

It is further object of the invention to provide such a method that determines the point of parabolic curvature based on uncalibrated images of the specular object.

It is further object of the invention to demonstrate that for the specular object under a certain imaging setup, image derivatives at the points of parabolic curvature exhibit degeneracies independent of the surrounding environment, and to provide a method that uses the degeneracies to determine the point of parabolic curvature.

It is further object of the invention to provide a method for using the points of parabolic curvature for object detection, object recognition and pose estimation.

The subject invention resulted from the realization that under relative motion between a camera-object pair and the environment, features of the environment associated with each point of the surface of the object changes arbitrarily. However, points of parabolic curvature are tied to the surface of the specular object, and hence, the direction of an image gradient associated with these points of parabolic curvature are substantially constant.

One embodiment of the invention discloses a method for determining points of parabolic curvature on a surface of a specular object from a set of images of the object is acquired by a camera under a relative motion between a camera-object pair and the environment. The method determines directions of image gradients at each pixel of each image in the set of images, wherein pixels from different images corresponding to an identical point on the surface of the object form corresponding pixels. The corresponding pixels having substantially constant the direction of the image gradients are selected as pixels representing points of the parabolic curvature.

Another embodiment discloses a system for determining points of parabolic curvature on a surface of an object arranged in an environment, wherein the object is a specular object. The system comprises a camera-object pair configured to acquire a set of images of the object under a relative motion between a camera-object pair and the environment; and a processor configured to determine directions of image gradients at each pixel of each image in the set of images, wherein pixels from different images corresponding to an identical point on the surface of the object forms corresponding pixels, wherein the processor selects the corresponding pixels having substantially constant the directions of the image gradients as pixels representing a point of the parabolic curvature.

DETAILED DESCRIPTION OF THE PREFERRED EMBODIMENT

Figure 1:
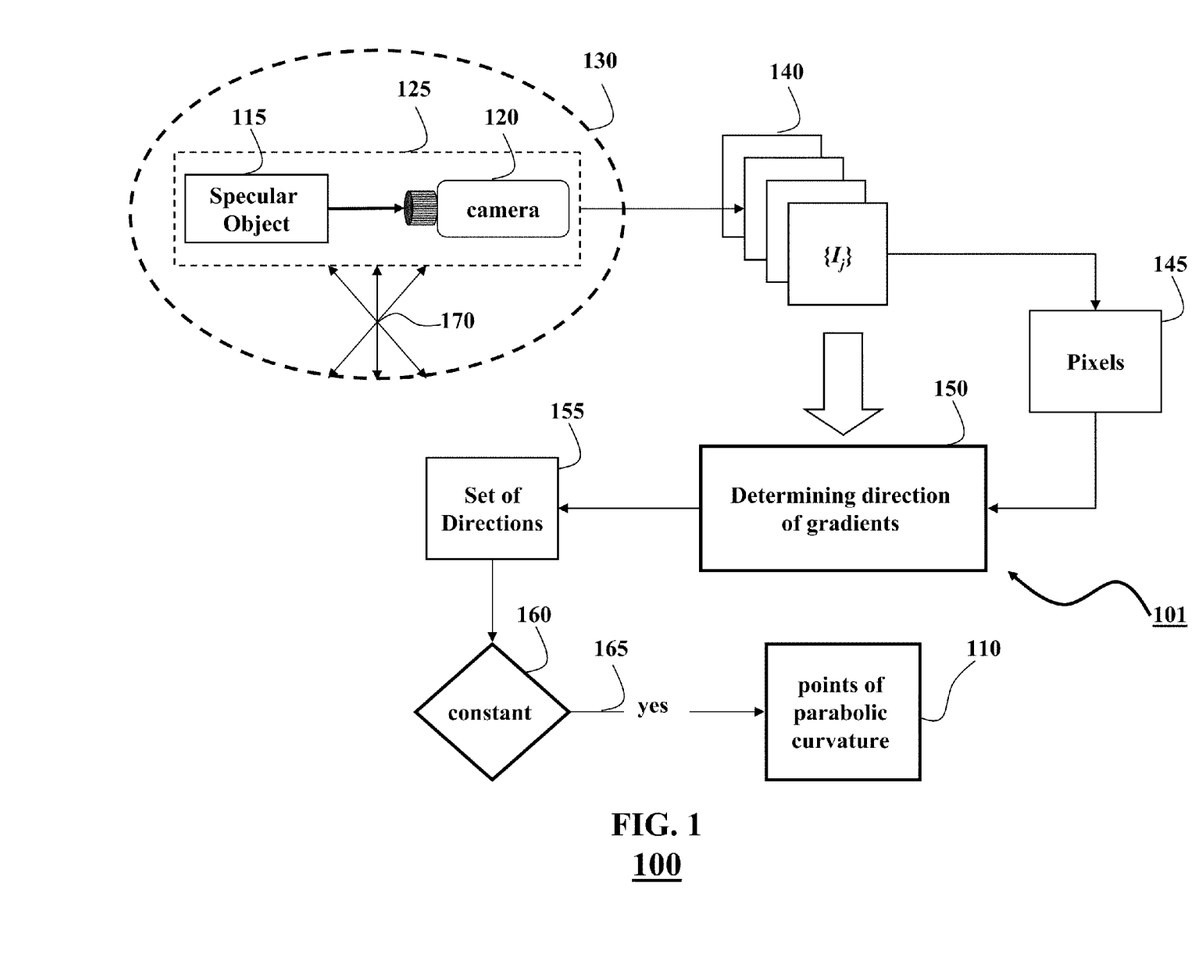
FIG. 1 is a block diagram of a method for determining a point of a parabolic curvature of a surface of an object according to an embodiment of an invention.
Figure 3A:
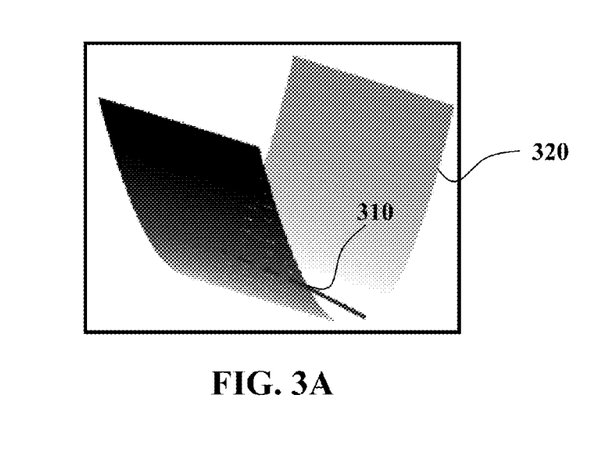
FIGS. 3A-3C are examples of points of parabolic curvatures.

FIG. 1 shows a method 100 for determining points 110 of parabolic curvature on the surface of an object 115 arranged in an environment 130. The object is a specular object having a parabolic curvature of the surface. The points of parabolic curvature are the points of a surface, wherein the surface has no bending (curvature) along only one direction. For example, if the object is a cylinder, the surface of the cylinder is formed by the points at a fixed distance from an axis of the cylinder. The surface of the cylinder curves in the direction, e.g., perpendicular to the axis. However, the surface has no bending in the direction parallel to the axis along a height of the cylinder. Example of the points 310 of parabolic curvature of the surface 320 is shown in FIG. 3A.

The points of parabolic curvature are determined based on a set 140 of images $\{I_j\}$ of the object acquired by a camera 120 under a relative motion 170 between a camera-object pair 125, and the environment. In the camera-object pair, a relative pose between the camera and the object is preserved. In different embodiments, the relative motion between the camera-object pair and the environment is achieved by moving arbitrarily the camera-object pair and/or the environment. A. For example, in one embodiment, the environment is moved by projecting various patterns on the environment using projectors. Steps of the method 100 are performed by a processor 101 as known in the art.

Figure 3B:
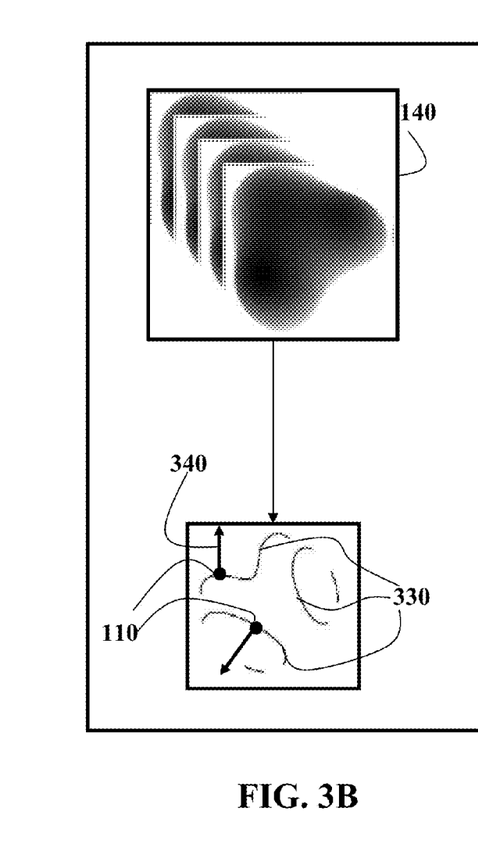
Figure 3C:
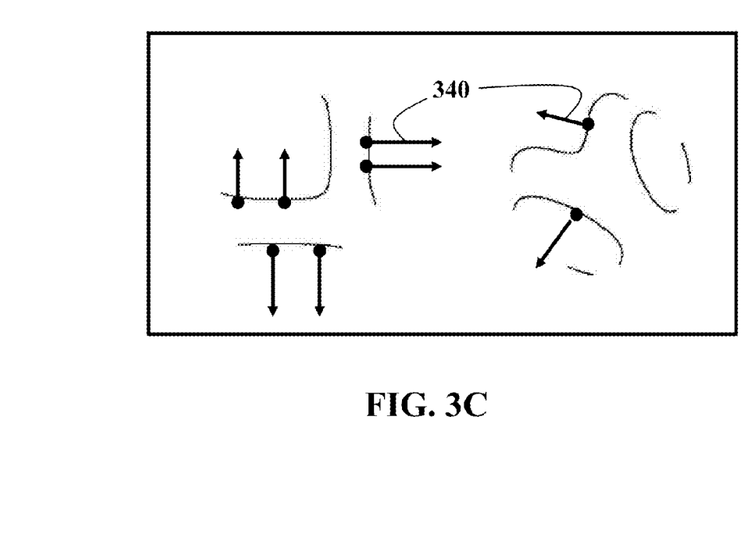

FIGS. 3B-C show an example of the set 140 of images and the points 110 of the parabolic curvatures. Typically, the points of parabolic curvature form a curve 330 on the surface of the object. The curve is referred herein as the curve of parabolic curvature.

Figure 5A:
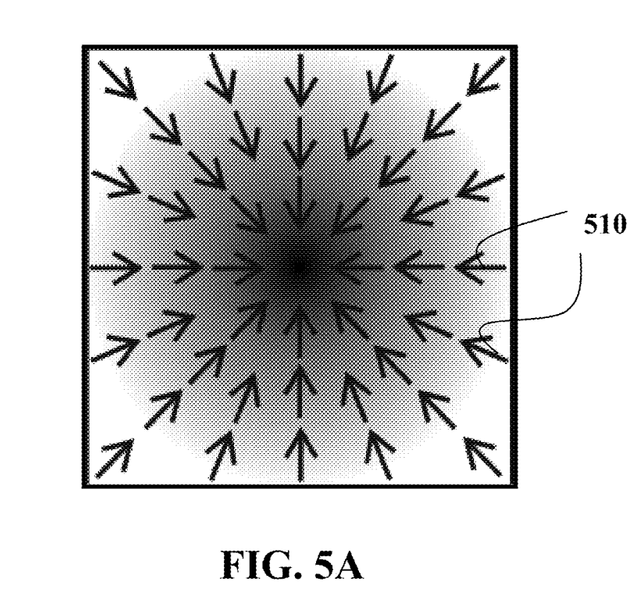
FIGS. 5A-5B is a visualization of image gradients.
Figure 5B:
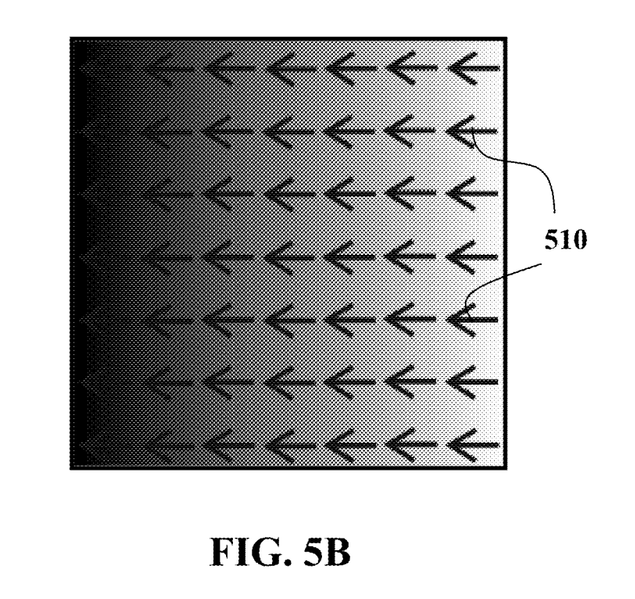

An image gradient describes a gradual blend of color from low to high intensity values of pixels in the images, such as in the images shown in FIGS. 5A-B. Mathematically, the image gradient is a two-variable function, e.g., the image intensity function. At each point of the image the function is determined by a gradient vector with components given by derivatives of the intensity values of pixels in horizontal and vertical directions. At each point, the gradient vector points in the direction of largest possible intensity increase or decrease as indicated by arrows 510. Length of the gradient vector corresponds to rate of change in the value of the intensities in that direction.

Embodiments of the invention are based on a realization that directions of the image gradients in the images of the specular objects are independent of the environment at the points of parabolic curvature. The image gradients are always oriented in the same direction on the points of parabolic curvature. In particular, as shown in FIGS. 3B-3C, the directions 340 of the image gradients are perpendicular 340 to the curve of the parabolic curvature.

The directions of the image gradients are determined 150 for all pixels of images in the set of images such that the direction of the image gradient at corresponding pixels 145 in the images forms a set of directions 155. The corresponding pixels are formed by pixels from different images corresponding to an identical point on the surface of the object, i.e., pixels having the same position in each image.

The corresponding pixels having substantially constant directions in the set of directions of the image gradients are selected as pixels representing a point of parabolic curvature. Accordingly, different corresponding pixels having substantially constant directions represent different points of parabolic curvature.

Figure 6:
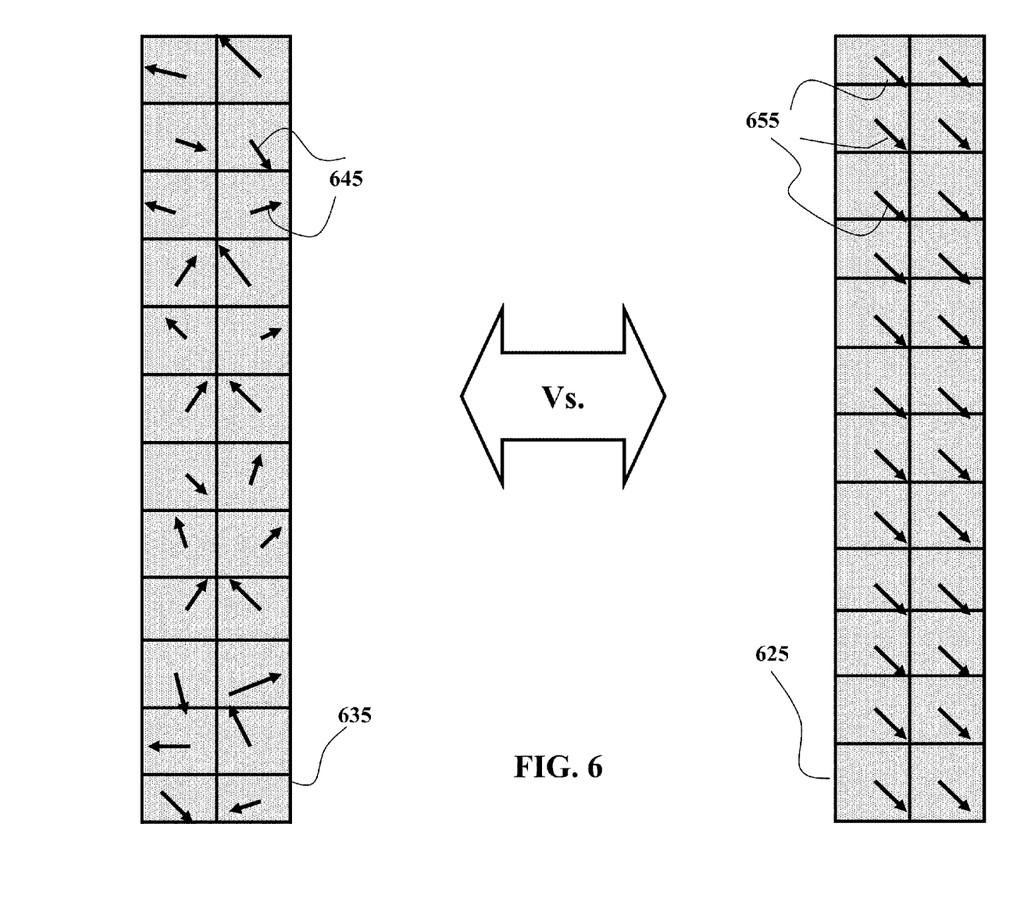
FIG. 6 is an example of environment reflections at a parabolic and a non parabolic point.

FIG. 6 shows fragments of images 140 of the specular object 115 having the points of parabolic and non-parabolic curvatures. The corresponding pixels 635 of the images 140 representing the point on non parabolic curvature have arbitrarily directions 645 of the image gradients. However, corresponding pixels 625 of the images 140 representing the point of the parabolic curvature have constant directions 655 of the image gradients.

Point of a Parabolic Curvature

In one embodiment, a shape of the specular object is defined using a Monge-Ampère equation $$(x,y,f(x,y)) = (x,f(x))$$

in a camera coordinate system where a function $f$ is twice continuously differentiable. At each point on the surface, a curvature along a curve is defined as a reciprocal of a radius of an osculating circle. The osculating circle is a circle whose center lies on the inner normal line, and curvature of the circle is the same as the curvature of the curve. The principal curvatures are defined as minimum and maximum values of the curvature measured along various directions at each point. The product of the principal curvatures is defined as the Gaussian curvature according to $$\frac{f_{xx}f_{yy} - f_{xy}^2}{1 + f_x^2 + f_y^2}. \tag{1}$$

Points at which one of the principal curvatures is zero are the points of the parabolic curvature. If we defining a Hessian matrix at a point x of the surface as $$H(x) = \frac{1}{2}\begin{bmatrix} f_{xx} & f_{xy} \\ f_{xy} & f_{yy} \end{bmatrix}_{(x)}, \tag{2}$$

then the points of the parabolic curvature have rank rank[$H(x)$]=1.

Image Formation for Specular Objects

Figure 2:
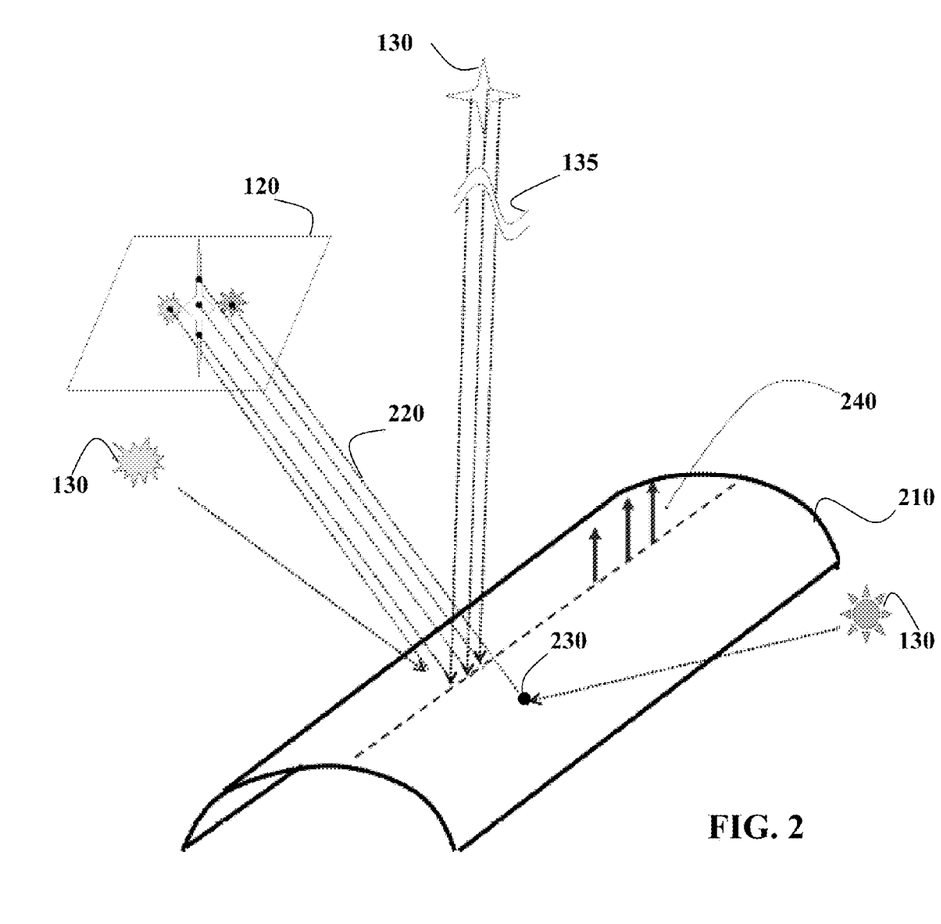
FIG. 2 is a schematic of an image formation model according to one embodiment of the invention.

FIG. 2 shows an image formation model according to one embodiment of the invention. The images observed on the surface 210 of the specular object warp the surrounding environment 130. Some embodiments of the invention model the camera 120 as an orthographic camera, i.e., all rays 220 entering the camera are parallel to a principal direction.

The image gradient at a location 230 of the pixel x is $\nabla f = (f_x, f_y)^T$, and a normal 240 to the surface is $$n(x) = \frac{1}{\sqrt{1 + \|\nabla f\|^2}}\begin{pmatrix} -\nabla f \\ 1 \end{pmatrix}. \tag{3}$$

A viewing direction v of the camera at each pixel is the same, i.e., $v = (0,0,1)^T$, where T is a transpose operator.

Under perfect mirror reflectance, the direction s(x) of the ray reflected onto the camera at a location of the pixel x is $$s = 2(n^T v)n - v \tag{4}$$

$$= \frac{1}{1 + \|\nabla f\|^2}\begin{pmatrix} -2\nabla f \\ 1 - \|\nabla f\|^2 \end{pmatrix}.$$

The ray s(x) is a unit vector in three dimensional space, and, therefore, can be represented with spherical coordinates $\Theta(x) = (\theta, \phi)$, such that
$S = [\sin\theta\cos\phi, \sin\theta\sin\phi, \cos\theta]^T$. The spherical coordinates can be found via $$\tan\phi(x) = \frac{f_y}{f_x} \tag{5}$$

$$\tan\theta(x) = \frac{2\|\nabla f\|}{1 - \|\nabla f\|^2}. \tag{6}$$

The environment observed by the camera at the location of the pixel x is defined by an intersection of the environment and the ray in the direction s(x) from the location of the pixel x, i.e., $(x,f(x))^T$.

In one embodiment, the environment is set at infinity. Accordingly, the dependence on the location of the pixels is suppressed, and the environment observed by the camera depends only on the gradient $\nabla f$ of the image. The embodiment defines an environment map $E: S^2 \mapsto \mathbb{R}$ over a sphere $S^2$, and selects the Euler angle parameterization for the sphere. Under no inter-reflectance within the object, a forward imaging equation for the intensity $I(x)$ observed at the location of the pixel x is $$I(x) = E(\Theta(x)) \tag{7}$$

where $\Theta(x)$ is the Euler angle of the observed ray according to Equations (5) and (6).

Differentiating Equation (7) with respect to the pixel x, the image gradients are determined according to $$\nabla_x I = 2H(x)\left[\frac{\partial \Theta}{\partial \nabla f}\right]^T \nabla_\Theta E, \tag{8}$$

wherein $\nabla_x I$ are the image gradient at the location of the pixel x, and $\nabla_\Theta E$ is a gradient of the environment with respect to spherical coordinates.

For the points of the parabolic curvature, the matrix $H(x)$ is singular. Therefore, the observed image gradient in the direction of the zero eigenvector is zero. Thus, the observed image gradient is oriented in the direction of the eigen-vector corresponding to non-zero eigen value of the matrix $H(x)$. The matrix $H(x)$ is a property of the surface and is independent of the environment. So, the direction of the image gradient is independent of the environment and is substantially constant at points of parabolic curvature. Furthermore, the non-zero eigenvector is oriented in the direction perpendicular to the curve of parabolic curvature. Therefore, at points of parabolic curvature, the direction of image gradients is independent of the environment and oriented in a direction perpendicular to the curve of parabolic curvature.

Invariant

As shown in FIG. 2, the surface $(x, f(x))$ of the specular object is smooth, placed with the environment at infinity and observed by the orthographic camera. The image gradients at the points of the parabolic curvature degenerate and take values along a single direction defined by the shape of the surface. The degeneration is independent of the environment, and defined as an invariant according to the embodiments.

The invariant arises due to the principal direction of zero curvature at the points of the parabolic curvature. By definition, an infinitesimal movement on the surface along the principle direction does not change the surface normal since the curvature is zero in that direction. Accordingly, the environment observed at the point of the parabolic curvature depends only on the surface normal. Hence, an infinitesimal displacement on the image plane along the projection of the principle direction does not change the environment observed. Accordingly, the image gradient along the principle is zero.

Mathematically, the invariant is expressed in various forms depending on the embodiment. Based on Equation (8), parabolic curvature at the point $x_0$ satisfies $$\nabla_x I(x_0) = \|\nabla_x I(x_0)\| v, \tag{9}$$

where v is the eigenvector of the matrix $H(x_0)$ with non-zero eigenvalue. Additionally or alternatively, some embodiments determine the points of the parabolic curvature using gradient autocorrelation matrix $M(x)$ defined according to $$M(x) = \sum_E ((\nabla_x I(x; E))(\nabla_x I(x; E))^T), \tag{10}$$

wherein $I(x; E)$ is the intensity observed at pixel x under the environment $E(\Theta)$. The summation of Equation (10) is determined over all possible mapping points of the environment, however at points of parabolic curvature, $$\text{rank}[M(x_0)] = 1. \tag{11}$$

In contrast with the parabolic surfaces, the gradient autocorrelation matrix $M(x)$ for elliptic and hyperbolic surfaces is full rank. For flat surfaces, matrix $H(x)$ is the zero matrix, the image gradients are zero and the gradient autocorrelation has zero rank.

In one embodiment, the invariant does not take inter-reflections into account. Inter-reflections alter the imaging process locally, and violate the image formation mode. Similarly, resolution of the images affects the embodiments of the invention. For images with low resolution, the curvature of the surface observed in a single pixel can deviate from the parabolic curvature.

Selecting Points of Parabolic Curvature

As described above, embodiments of the invention select as the point of parabolic curvature the point on the surface of the object corresponding to the pixel having a substantially constant direction of the image gradient.

For example, one embodiment determines the gradient autocorrelation matrix using image gradients determined at each image j in the set of images $\{I_j\}$ according to $$M(x) = \sum_j \nabla_x I_j(x) \nabla_x I_j(x)^T, \tag{12}$$

wherein j is the image in the set of images $\{I_j\}$, $\nabla_x I$ is the image gradient, $I(x)$ is an intensity observed at a location of a pixel x, T is the transpose operator. Ratio of the eigenvalues of the gradient autocorrelation matrix is used as statistic to select the pixel x as the point of the parabolic curvature.

Pose of the Object

In one embodiment of the invention, the points of the parabolic curvature facilitate determination of a pose of the object. The pose determination method according the embodiment recovers three dimensional (3D) rotation and 3D translation parameters with respect to a predefined nominal pose of the object. If the camera is orthographic, then the pose of the object pose is recovered up to a depth ambiguity.

Figure 4:
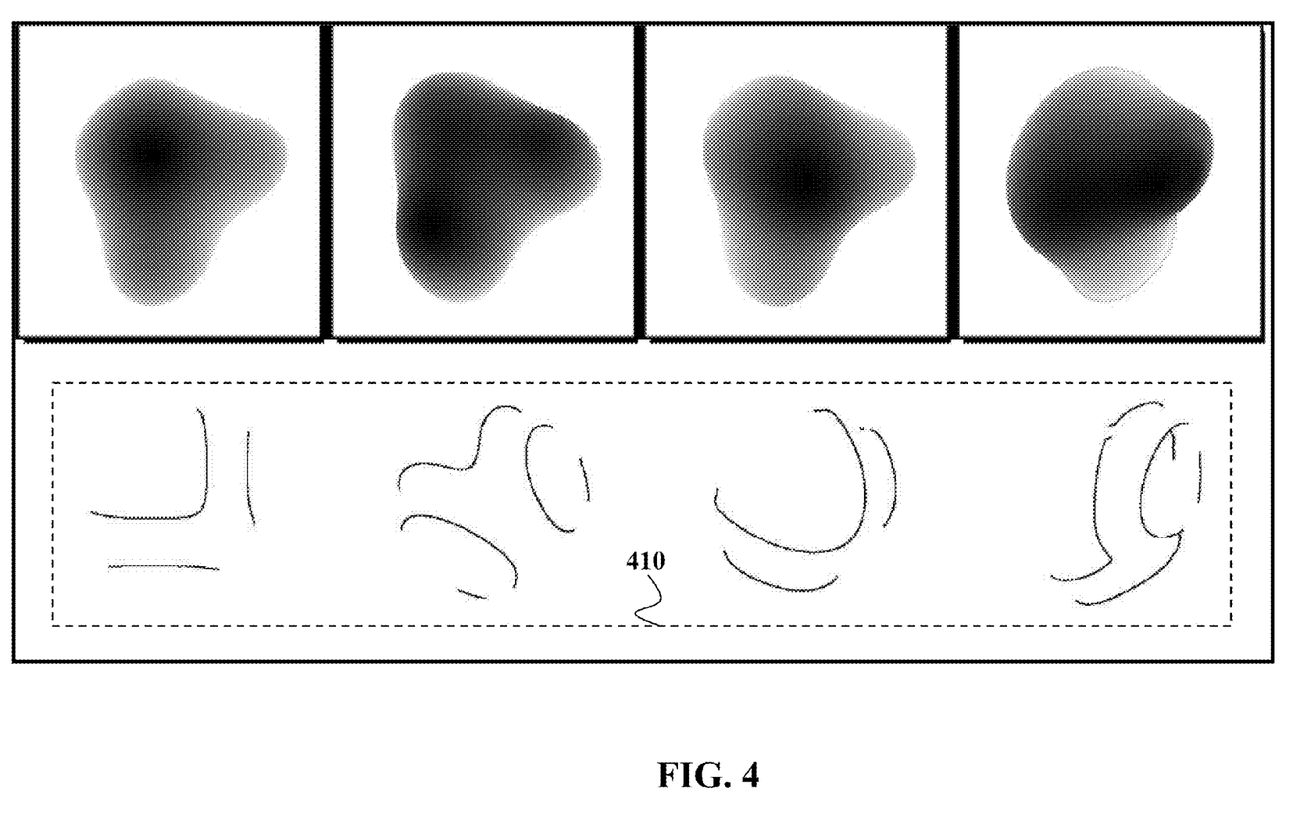
FIG. 4 is an example of a database of parabolic curvatures.

As shown in FIG. 4, templates 410 of parabolic curvatures are determined by rotating the points of the parabolic curvature. In one embodiment, a parametric form and/or a 3D model of the object is acquired in advance. The 3D positions of the points of the parabolic curvature at object coordinates are recovered either analytically using a parametric form, or numerically using the 3D model of the object. During initialization, the templates are determined by rotating the points of parabolic curvature with respect to a set of sampled 3D rotations and projecting visible points to an image plane.

One variation of this embodiment considers storing only out-of-plane rotations ($\theta_x$ and $\theta_y$) in the database, because the rotation of the object along principal axes ($\theta_z$) of the camera results in an in-plane rotation of the parabolic curvature points on the image plane. The rotations is performed by uniform sampling of the angles on a 2-sphere.

The pose of the object is determined by searching the templates and optimal Euclidean transformation parameters $s=(\theta_z, t_x, t_y)$, which aligns the templates with the points of the parabolic curvature of the object. One embodiment uses a chamfer matching technique to measure a similarity between the templates and the points of the parabolic curvatures. The template with the most similar parabolic curves to the points of the parabolic curvature is selected as the pose of the object.

Precision of the pose is limited by the discrete set of out-of-plane rotations included into the database. In one embodiment, the pose is refined using a combination of iterative closest point and Gauss-Newton optimization.

Recognition

The points of the parabolic curvature allow recognizing different objects in variable poses. The object recognition method is an extension of the aforementioned pose determination method. For each object, the pose determination is repeated to recover best pose parameters. A class of the object is determined based on a minimum of the chamfer cost function over different classes of the object.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining points of parabolic curvature on a surface of an object arranged in an environment, wherein the object is specular, comprising the steps of:
    obtaining a set of images of the object acquired by a camera under a relative motion between a camera-object pair and the environment;
    determining directions of image gradients at each pixel of each image in the set of images, wherein pixels from different images corresponding to an identical point on the surface of the object form corresponding pixels; and
    selecting the corresponding pixels having substantially constant the directions of the image gradients as pixels representing points of the parabolic curvature, wherein the steps of the method are performed by a processor.

2. The method of claim 1, wherein the surface at the points of the parabolic curvature curves only in one direction.

3. The method of claim 1, wherein a relative pose between the camera and the object is preserved during the relative motion.

4. The method of claim 1, wherein the relative motion between the camera-object pair and the environment is achieved by moving arbitrarily at least one of the camera-object pair and the environment.

5. The method of claim 1, wherein different corresponding pixels having the substantially constant directions of the image gradients represent different points of the parabolic curvature.

6. The method of claim 1, wherein the surface is twice continuously differentiable.

7. The method of claim 1, wherein the camera is an orthographic camera.

8. The method of claim 1, wherein the environment is set at infinity, such that the environment observed by the camera depends only on the image gradients.

9. The method of claim 1, further comprising:
    determining a gradient autocorrelation matrix M(x) according to $$M(x) = \sum_j \nabla_x I_j(x) \nabla_x I_j(x)^T,$$

wherein j indexes of the images in the set of images $\{I_j\}$, $\nabla_x I$ is the image gradient, I(x) is an intensity at a pixel x, and $^T$ is a transpose operator.

10. The method of claim 1, further comprising:
    repeating the selecting to determine all the points of the parabolic curvature.

11. The method of claim 10, further comprising:
    determining a pose of the object based on the points of the parabolic curvature.

12. The method of claim 11, further comprising:
    acquiring templates of parabolic curvatures determined by rotating the points of the parabolic curvature; and
    determining an optimal transformation parameters aligning the templates with points of the parabolic curvature.

13. The method of claim 11, further comprising:
    determining similarities between the templates and the points of the parabolic curvatures using a chamfer matching technique.

14. The method of claim 11, further comprising:
    refining an estimation of the pose using a Gauss-Newton optimization.

15. The method of claim 10, further comprising:
    determining a type of the object based on the points of parabolic curvature.

16. A system for determining points of parabolic curvature on a surface of an object arranged in an environment, wherein the object is a specular object, comprising:
    a camera-object pair configured to acquire a set of images of the object under a relative motion between a camera-object pair and the environment; and
    a processor configured to determine directions of image gradients at each pixel of each image in the set of images, wherein pixels from different images corresponding to an identical point on the surface of the object forms corresponding pixels, wherein the processor selects the corresponding pixels having substantially constant the directions of the image gradients as pixels representing a point of the parabolic curvature.

17. The system of claim 16, wherein the relative motion between the camera-object pair and the environment is achieved by moving arbitrarily at least one of the camera-object pair and the environment.

18. The system of claim 16, further comprising:
    determining a pose of the object based on the points of the parabolic curvature.

19. The system of claim 16, further comprising:
    determining a type of the object based on the points of parabolic curvature.

20. The system of claim 16, wherein the surface at the points of the parabolic curvature curves only in one direction.

* * * * *